(12) United States Patent
Nakamura et al.

(10) Patent No.: US 12,116,107 B2
(45) Date of Patent: Oct. 15, 2024

(54) FLYING BODY PROVIDED WITH BODY TO BE DEPLOYED

(71) Applicant: NIPPON KAYAKU KABUSHIKI KAISHA, Tokyo (JP)

(72) Inventors: Hiroshi Nakamura, Tokyo (JP); Yasuhiko Yagihashi, Tokyo (JP); Akihiro Tamashiro, Tokyo (JP)

(*) Notice: Subject to any disclaimer, the term of this patent is extended or adjusted under 35 U.S.C. 154(b) by 0 days.

(21) Appl. No.: 18/479,928

(22) Filed: Oct. 3, 2023

(65) Prior Publication Data

US 2024/0025535 A1 Jan. 25, 2024

Related U.S. Application Data

(62) Division of application No. 17/279,100, filed as application No. PCT/JP2019/032921 on Aug. 22, 2019.

(30) Foreign Application Priority Data

Sep. 28, 2018 (JP) ................................ 2018-185967
Sep. 28, 2018 (JP) ................................ 2018-185977

(51) Int. Cl.
*B64C 13/20* (2006.01)
*B64C 31/036* (2006.01)
*B64D 45/04* (2006.01)

(52) U.S. Cl.
CPC ............ *B64C 13/20* (2013.01); *B64C 31/036* (2013.01); *B64D 45/04* (2013.01)

(58) Field of Classification Search
CPC ....... B64C 13/20; B64C 31/036; B64D 45/04; B64D 17/62; B64D 2201/00; B64D 17/34;
(Continued)

(56) References Cited

U.S. PATENT DOCUMENTS

9,307,383 B1* 4/2016 Patrick .................. B64U 10/14
2012/0083931 A1* 4/2012 Wang .................... F03D 7/0204
700/287
(Continued)

*Primary Examiner* — Donald J Wallace
*Assistant Examiner* — Jalal C Coduroglu
(74) *Attorney, Agent, or Firm* — Patshegen IP; Moshe Pinchas (57) ABSTRACT

To provide a flying object including a lift generating member deployment device that makes it easier than before to automatically avoid collision with an obstacle. A flying object 30 includes an obstacle detecting unit 5, a control unit 6, a battery 7, a storage unit 8 that stores information transmitted from the control unit 6, a transmitting/receiving unit 9 that receives an operation signal from a controller 40 and transmits information regarding the flying object 30 to the controller 40, and others. The obstacle detecting unit 5 is to detect the altitude of the flying object 30 and outputs an altitude detection signal, which represents the detected altitude information, to the control unit 6. In addition, upon detecting an obstacle present within a predetermined distance, the obstacle detecting unit 5 outputs an obstacle detection signal to the control unit 6, detects the distance between the flying object body 31 and the obstacle, and outputs a distance detection signal, which represents the detected distance information, to the control unit 6. The control unit 6 determines whether or not to actuate left and right brake cord pulling devices 10 in accordance with the signal received from the obstacle detecting unit 5.

7 Claims, 7 Drawing Sheets

(58) Field of Classification Search
CPC .... B64D 17/80; B64U 2201/10; B64U 10/50; B64U 70/83
See application file for complete search history.

(56) References Cited

U.S. PATENT DOCUMENTS

| | | | |
|---|---|---|---|
| 2018/0072414 A1* | 3/2018 | Cantrell | B64C 3/56 |
| 2018/0109223 A1* | 4/2018 | Panas | B64B 1/58 |
| 2018/0158686 A1* | 6/2018 | Gelatos | H01L 21/76843 |
| 2019/0077510 A1* | 3/2019 | Panas | G06F 16/2365 |
| 2019/0317530 A1* | 10/2019 | Yang | G08G 5/0013 |
| 2019/0385057 A1* | 12/2019 | Litichever | H04L 63/14 |
| 2020/0017224 A1* | 1/2020 | Lunerti | B64D 17/02 |
| 2020/0198791 A1* | 6/2020 | Nakamura | B64U 10/50 |
| 2020/0364456 A1* | 11/2020 | Tran | A01G 22/00 |

* cited by examiner

FLYING BODY PROVIDED WITH BODY TO BE DEPLOYED

TECHNICAL FIELD

The present invention relates to a flying object including a to-be-deployed object.

BACKGROUND ART

In recent years, flying objects have been increasingly used in industries as autonomous control technologies and flight control technologies are developed. Examples of the flying objects include a drone. A drone flies by, for example, rotating a plurality of rotary wings simultaneously in a well-balanced matter, moving upward and downward by increasing or decreasing the rotation speed of the rotary wings, and moving forward and backward by tilting the flying object body through an increase or decrease in rotation speed of the rotary wings.

On the other hand, there is concern about the risk of accidental falls of such flying objects, which hinders the flying objects from being widespread. In order to reduce the risk of such accidental falls, safety devices are being commercially introduced including deployment devices for parachutes, paragliders, or other to-be-deployed objects, airbag devices, and the like. For example, Patent Literature 1 discloses an unmanned flight vehicle (flying object) that actuates a piston in a cylinder through the use of a repulsive force of a spring, causes a lift generating member (a cloth portion of the to-be-deployed object) to be ejected outside from an opening by the actuated piston so that the lift generating member is opened, and then becomes capable of steering the lift generating member by pulling the lift generating member through a brake cord.

CITATION LIST

Patent Literature

Patent Literature 1: JP 2018-43467 A

SUMMARY OF INVENTION

Technical Problems

However, although being capable of pulling a brake cord, the above-mentioned conventional flying object fails to instantly pull the brake cord in the event that the flying object is unintentionally brought closer to an obstacle (such as a ground surface, building, person, animal, or the like) during falling because the flying object itself is unable to detect such nearby obstacle. Therefore, in some cases, the above-mentioned conventional flying object may have difficulty in avoiding collision with an obstacle and, furthermore, the conventional flying object may have difficulty in mitigating an impact of collision because the flying object may collide with the obstacle before decelerated.

In addition, although being capable of pulling a brake cord, when, for example, the wind suddenly changes its direction into a tailwind, the above-mentioned conventional flying object cannot be steered suitably for the wind direction because the flying object itself is unable to detect such situation. Therefore, when, for example, subjected to a tailwind at a relatively low altitude, the above-mentioned conventional flying object may stall and fall.

Accordingly, the present invention has been made in view of such circumstances, and an object of the present invention is to provide a flying object including a lift generating member deployment device that makes it easier than before to automatically avoid collision with an obstacle and, in addition, makes it easier than before to automatically mitigate an impact of collision even when the flying object collides with an obstacle during falling, as well as providing a flying object including a lift generating member deployment device capable of steering the flying object suitably for a wind direction.

Solutions to Problems (1) A flying object of the present invention includes: a flying object body; a to-be-deployed object that is disposed in the flying object body and includes a lift generating member and a steering unit capable of steering the lift generating member after deployment via a connecting member connected to the lift generating member; an obstacle detecting unit that is disposed in the flying object body and detects an obstacle present within a predetermined distance; and a control unit that receives, when the obstacle detecting unit detects an obstacle, an obstacle detection signal from the obstacle detecting unit, in which after the to-be-deployed object is deployed, the control unit operates the steering unit, on the basis of the obstacle detection signal received from the obstacle detecting unit, to perform at least either one of control to avoid collision with the obstacle or control to mitigate collision with the obstacle.

Here, the to-be-deployed object may be in any form as long as the to-be-deployed object having been deployed can decelerate the flying object by generating lift or buoyancy, and examples of the to-be-deployed object include a parafoil, a Rogallo paraglider, a Rogallo parachute, a triangular paraglider, and a triangular parachute. The lift generating member generates lift or buoyancy in the deployed state, and specific examples of the lift generating member include a cloth portion (canopy) of a paraglider, a triangular parachute, or a Rogallo parachute, each of which is one of examples of the to-be-deployed object. Although a mainstream paraglider has an air intake in order to maintain the wing shape using ram air, some of the above-described paragliders may have no air intake (single surface, for example). For a stable flight, a paraglider with an air intake is more preferred. Furthermore, a paraglider capable of forcibly obtaining a propulsive force for flying with a propelling device such as a propeller attached thereto may be used.

(2) It is preferable that the flying object according to (1) further includes a deployment device for the lift generating member, the deployment device being disposed in the flying object body, in which the deployment device includes: a containing unit that holds the lift generating member being in a closed state; and an ejecting unit that ejects the lift generating member from the containing unit, and after the deployment device is actuated, the control unit performs at least either one of control to avoid collision with the obstacle or control to mitigate collision with the obstacle.

(3) It is preferable that in the flying object according to (2), the obstacle detecting unit includes at least one of a laser sensor, an ultrasonic sensor, a millimeter wave radar, a submillimeter wave radar, and a camera.

In the configuration according to (2) or (3), by controlling the steering unit (the brake cord, for example) for the lift generating member, the flying object of the present invention can automatically avoid an obstacle if the flying object is likely to collide with the obstacle and, even if the flying object should collide with an obstacle, the flying object can reduce the descending speed to a sufficient degree prior to collision, and thus the impact of collision can be automatically mitigated. In particular, since the flying object of the present invention can reduce the descending speed to a sufficient degree immediately before landing, the flying object achieves soft-landing, and thus the impact of collision with the landing place can be automatically mitigated. Furthermore, the flying object of the present invention can well exert the above-described individual effects even when the flying object is applied to an industrial large-sized flying object.

(4) A flying object of the present invention includes: a flying object body; a to-be-deployed object that is disposed in the flying object body and includes a lift generating member and a steering unit capable of steering the lift generating member after deployment via a connecting member connected to the lift generating member; a data receiving unit that receives position data indicating a position of the obstacle, the position data being transmitted from a data transmitting unit that is disposed in an obstacle around the flying object body or is held by the obstacle; and a control unit that receives, when the data receiving unit receives the position data, the position data from the data receiving unit, in which after the to-be-deployed object is deployed, the control unit operates the steering unit, on the basis of the position data received from the data receiving unit, to perform at least either one of control to avoid collision with the obstacle or control to mitigate collision with the obstacle.

(5) It is preferable that the flying object according to (4) further includes a deployment device for the lift generating member, the deployment device being disposed in the flying object body, in which the deployment device includes: a containing unit that holds the lift generating member being in a closed state; and an ejecting unit that ejects the lift generating member from the containing unit, and after the deployment device is actuated, the control unit performs at least either one of control to avoid collision with the obstacle or control to mitigate collision with the obstacle.

(6) In the flying object according to (4) or (5), the data receiving unit may receive the position data via a relay station that receives the position data.

(7) In the flying object according to any of (4) to (6), the position data preferably includes at least one data item among atmospheric pressure, altitude, GPS, acceleration, speed, and distance.

In the configuration according to any of (4) to (7), the flying object of the present invention can obtain position data indicating the position of the obstacle (for example, position data about a mobile terminal possessed by a person in the case where the obstacle is a person (atmospheric pressure sensor and GPS, and three-dimensional map data in the future) or position data provided in a car in the case where the obstacle is a car (GPS, and three-dimensional map data in the future) and, on the basis of such data, the flying object can operate the steering unit to perform control to avoid collision with the obstacle or control to mitigate collision with the obstacle or the like. As a result, the flying object is allowed to fly (fall) while avoiding the obstacle in advance and, in addition, even if the flying object should be involved in collision while falling, the damage can be minimized because the flying object can be decelerated in advance in anticipation of the collision.

(8) A flying object of the present invention includes: a flying object body; a to-be-deployed object that is disposed in the flying object body and includes a lift generating member and a steering unit capable of steering the lift generating member after deployment via a connecting member connected to the lift generating member; a wind direction detecting unit that is disposed in the flying object body and detects a wind direction; and a control unit that receives, when the wind direction detecting unit detects the wind direction, a wind direction signal including information regarding the wind direction from the wind direction detecting unit, in which after the to-be-deployed object is deployed, the control unit performs control to operate the steering unit, as necessary, on the basis of the wind direction signal received from the wind direction detecting unit.

Here, the lift generating member may be in any form as long as the lift generating member having been deployed generates lift, and examples of the lift generating member include a parafoil, a Rogallo paraglider, a Rogallo parachute, a triangular paraglider, and a triangular parachute. The lift generating member generates lift or buoyancy in the deployed state, and specific examples of the lift generating member include a cloth portion (canopy) of a paraglider, a triangular parachute, or a Rogallo parachute, each of which is the to-be-deployed object. Although a mainstream paraglider has an air intake in order to maintain the wing shape using ram air, some of the above-described paragliders may have no air intake (single surface, for example). For a stable flight, a paraglider with an air intake is more preferred. Furthermore, a paraglider capable of forcibly obtaining a propulsive force for flying with a propelling device such as a propeller attached thereto may be used.

In the configuration according to (8), the flying object can be easily oriented to move in a suitable direction with respect to the wind direction (for example, in a direction different from the direction of a tailwind). Furthermore, the flying object of the present invention can well exert the above-described effects even when the flying object is applied to an industrial large-sized flying object.

(9) It is preferable that the flying object according to (8) further includes a deployment device for the lift generating member, the deployment device being disposed in the flying object body, in which the deployment device includes: a containing unit that holds the lift generating member being in a closed state; and an ejecting unit that ejects the lift generating member from the containing unit, and after the deployment device is actuated, the control unit performs control to operate the steering unit, as necessary, on the basis of the wind direction signal received from the wind direction detecting unit.

(10) In the flying object according to (8) or (9), it is preferable that the wind direction detecting unit detects a wind direction at time intervals of one second or less (preferably 0.1 seconds or less, more preferably 0.01 seconds or less).

In the configuration according to (10), in the case where the wind direction detecting unit detects a wind direction at time intervals of about one second, the flying object at an altitude of, for example, about 150 m, can be oriented to move in a suitable direction with respect to a wind direction by the time when the flying object falls to the ground or the like. In the case where the wind direction detecting unit detects a wind direction at time intervals of about 0.1 seconds, the flying object at an altitude of, for example, about 20 m, can be oriented to move in a suitable direction with respect to a wind direction by the time when the flying object falls to the ground or the like. In the case where the wind direction detecting unit detects a wind direction at time intervals of about 0.01 seconds, the flying object at an altitude of, for example, about 2 m, can be oriented to move in a suitable direction with respect to a wind direction by the time when the flying object falls to the ground or the like.

(11) In the flying object according to any of (8) to (10), it is preferable that the wind direction detecting unit includes a weathercock-type wind direction indicator.

In the configuration according to (4), the wind direction can be easily detected.

(12) In another aspect, in the flying object according to any of (8) to (10), the wind direction detecting unit may include at least one wind speed meter.

In the configuration according to (12), the wind direction and wind speed can be easily detected. In particular, if a plurality of wind speed meters is included, the wind direction and wind speed can be detected with higher precision.

(13) In another aspect, in the flying object according to any of (8) to (10), the wind direction detecting unit may include a high-rate GPS that determines positions at a higher rate than a GPS and a geomagnetic sensor that detects an orientation of the flying object.

In the configuration according to (13), the absolute wind direction on the flying object can be detected at intervals of, for example, 0.1 seconds or less, and because of using the detected absolute wind direction, the steering unit in the flying object can be controlled and operated more quickly.

(14) In another aspect, in the flying object according to any of (8) to (10), the wind direction detecting unit may include a GPS, and an acceleration sensor and a compass that detect an orientation of the flying object.

In the configuration according to (14), the absolute wind direction on the flying object can be detected at intervals of, for example, one second or less, and because of using the detected absolute wind direction, the steering unit in the flying object can be controlled and operated quickly. In other words, although control and operation of the steering unit in the flying object cannot be done as quickly as in the configuration according to (13), when the flying object is at a relatively high altitude (about 150 m, for example), the steering unit can be controlled and operated sufficiently quickly before the flying object falls to the ground.

DESCRIPTION OF EMBODIMENTS

First Embodiment

A first embodiment of the present invention will now be described with reference to FIGS. 1 to 3.

Figure 1:
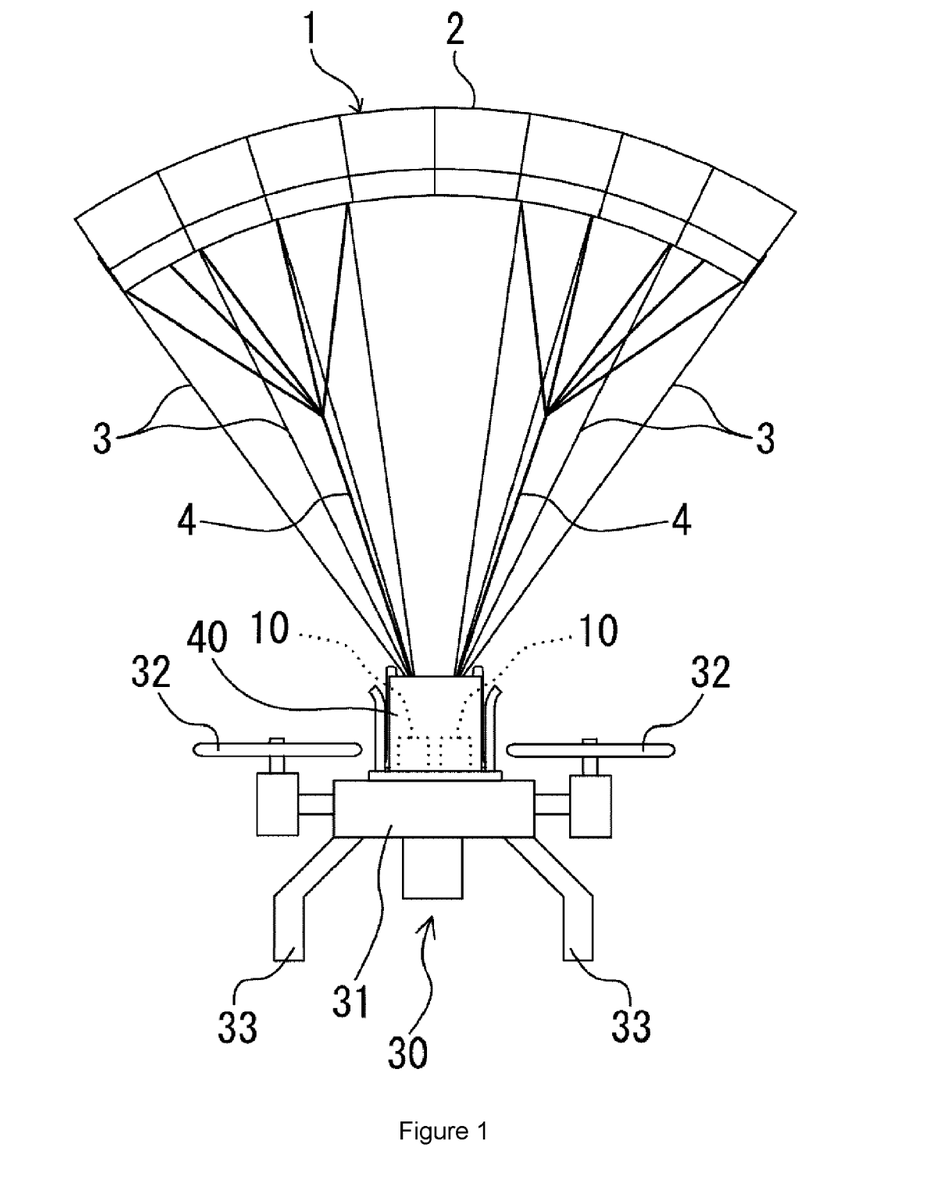
FIG. 1 is a front view of a flying object according to a first embodiment of the present invention, with a paraglider disposed therein being deployed.

As illustrated in FIG. 1, the flying object 30 includes a flying object body 31, one or more propelling mechanisms (propellers, for example) 32 coupled to the flying object body 31 to propel the flying object body 31, a plurality of legs 33 disposed under the flying object body 31, and a paraglider deployment device 80, which is a to-be-deployed object.

With reference to FIG. 1, the paraglider 1 includes a canopy 2 that bears air to form an airfoil as a whole and a plurality of suspension lines 3 that are extended downward from the canopy 2 and connected to the flying object 30.

As illustrated in FIG. 1, the canopy 2 is formed so as to spread out sideways into a substantially arc shape above the flying object 30 as viewed from the front of the paraglider 1. The suspension lines 3 (lines) are extended from the canopy 2 to the flying object 30 so that two groups of four lines are horizontally symmetrical. Note that one end of each suspension line 3 may be connected to a device attached to the flying object 30.

A pair of left and right brake cords 4 are used for steering the flying object 30. One end of each brake cord is midway branched into four cords symmetrically and connected to a rear edge of the canopy 2, and the other end of each brake cord is connected to a reel 14 of each brake cord pulling device 10, which is described later.

In an emergency, the flying object 30 having the paraglider deployment device 80 deployed is to be manipulated to turn, move upward, or move downward by deforming the canopy 2 to change the received wind pressure resistance through operation of the left and right brake cords 4. For example, to turn the flying object 30 clockwise, the right brake cord 4 is pulled to increase the resistance to the right side of the canopy 2 so that the right side of the canopy 2 is decelerated, thereby changing the direction of the flying object 30. In addition, to land the flying object 30, the left and right brake cords 4 are pulled to increase the resistance to the entire canopy 2, whereby the descending speed is decreased and the flying object 30 is landed. Note that the operation of pulling the brake cord 4 refers to the operation of reeling the brake cord 4 around the reel 14 of the brake cord pulling device 10, which is described later.

Figure 2:
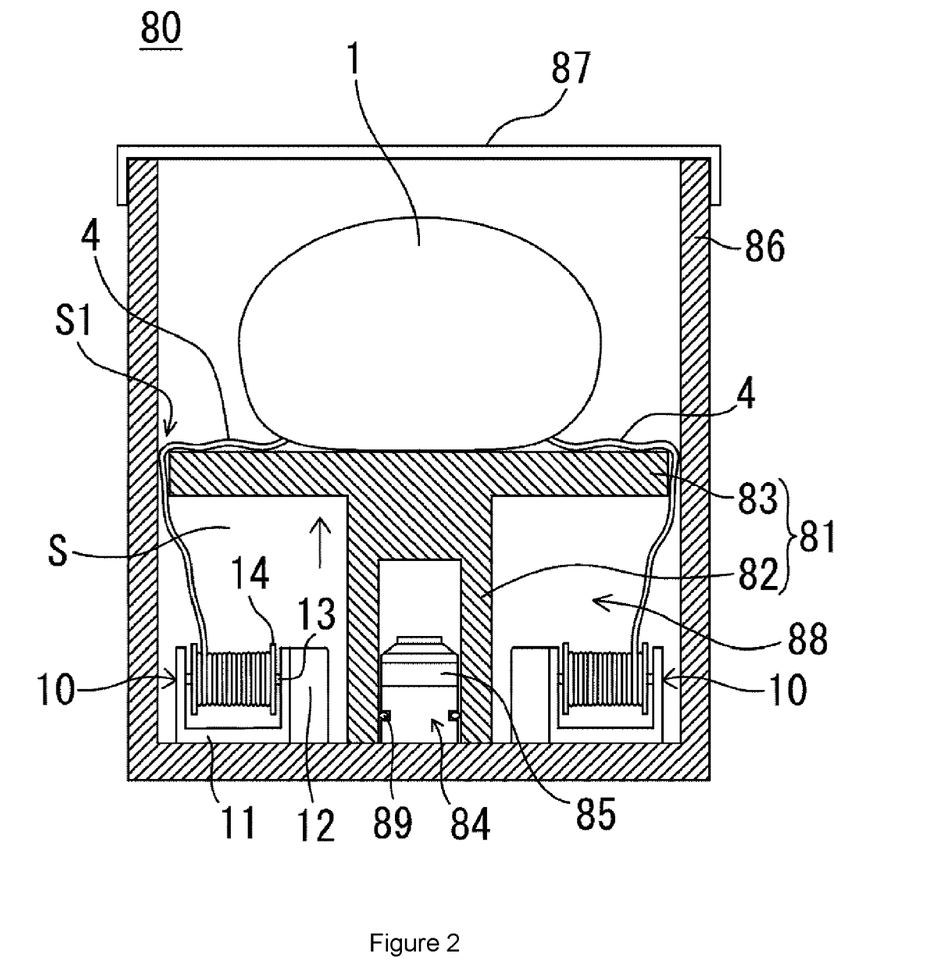
FIG. 2 is a cross-sectional view of a paraglider deployment device in FIG. 1 the deployment device being not actuated yet.

As illustrated in FIG. 2, the paraglider deployment device 80 before actuated includes an actuator 88, the paraglider 1, and the brake cord pulling device 10. The actuator 88 includes a gas generator 84 that includes a case 85 being cup-shaped and containing an ignition charge (not illustrated), a piston 81 (moving member) that includes a recess (recessed member) 82 and a piston head 83 (launch platform) formed integrally with the recess 82, and a housing 86 (container) that is bottomed tubular, contains the piston 81, and regulates the propelling direction of the piston 81. Note that the paraglider 1 and the suspension lines 3 in the paraglider deployment device 80 in the normal state (before deployment) are folded and contained in the cylindrical housing 86. In an emergency, the paraglider 1 and the suspension lines 3 are ejected out of the housing 86, caused by activation of the actuator 88 (see FIG. 2) or the like that has received an abnormality signal from a control unit 6 (see FIG. 3) in the flying object 30, and then deployed as illustrated in FIG. 1 and used.

In addition, as illustrated in FIG. 2, a communicating portion S1, which constitutes a gap (clearance), is formed between the inner wall of the housing 86 and the periphery of the piston head 83. When the piston 81 is moved (ejected in the direction of the arrow in FIG. 2), a space S between the inner wall of the housing 86 and the piston head 83 is subjected to a negative pressure. However, since air enters the space S from the communicating portion S1, the negative pressure can then be reduced to allow the piston 81 to move smoothly.

The gas generator 84 is disposed in the recess 82. A gas jet nozzle is disposed at the tip of the gas generator 84 so that ignition caused by an electrical signal can generate a gas in the recess 82, the gas serving as a propulsive force for ejecting the piston 81 in the direction of the arrow in FIG. 2. In addition, a seal member 89 such as an O-ring is disposed between the recess 82 and the outer wall of the gas generator 84 so as to prevent gas leakage during actuation.

Although not illustrated, the gas generator 84, which is small-sized and lightweight, includes a cup body filled with a gas generating agent, an exploder for igniting the gas generating agent, and a holder for holding the exploder. The gas generator 84 may be, for example, a micro gas generator; however, any device may be used as long as the device is capable of generating a gas. Note that the gas generating agent is an agent (gun powder or propellant) that is ignited by thermal particles generated by the actuated exploder and burns to generate a gas.

In general, gas generators can be roughly divided into those of non-gun powder type and those of gun powder type. A mainstream gas generator of non-gun powder type is caused to emit a gas by connecting a sharp member such as a needle and a compressed spring to a gas cylinder that contains a gas such as carbon dioxide or nitrogen, and blowing off the sharp member using a spring force so that the sharp member collides against a sealing plate that seals the cylinder. In this case, a drive source such as a servomotor is usually used to release the compressive force of the spring. A gas generator of gun powder type may be an independent exploder unit or may include an exploder and a gas generating agent. Alternatively, a gas generator of hybrid type or stored type in which a sealing plate in a small gas cylinder is cleaved by a force of gun powder to release an internal gas to the outside may be used. In this case, the pressurized gas in the gas cylinder is selected from at least one of non-combustible gases such as argon, helium, nitrogen, and carbon dioxide. In addition, the gas generator may include a heating element of gun powder type to ensure that the pressurized gas, when released, is expanded. Furthermore, the gas generator may include a filter and/or an orifice for adjusting the gas flow rate, as necessary.

As the gas generating agent, a non-azide based gas generating agent is preferably used and, in general, a gas generating agent is formed into a molding containing a fuel, an oxidizing agent, and an additive. As the fuel, for example, a triazole derivative, a tetrazole derivative, a guanidine derivative, an azodicarbonamide derivative, a hydrazine derivative, or the like, or a combination thereof is used. Specifically, for example, nitroguanidine, guanidine nitrate, cyanoguanidine, 5-aminotetrazole, or the like is suitably used. As the oxidizing agent, for example, a basic nitrate such as basic copper nitrate, a perchlorate such as ammonium perchlorate and potassium perchlorate, or a nitrate containing cations selected from alkali metals, alkaline earth metals, transition metals, and ammonia is used. As the nitrate, for example, sodium nitrate, potassium nitrate, or the like is suitably used. Examples of the additive include a binder, a slag forming agent, and a combustion adjusting agent. As the binder, for example, an organic binder such as a metal salt of carboxymethyl cellulose or stearate, or an inorganic binder such as synthetic hydroxytalcite or acidic white clay may be suitably used. As the slag forming agent, silicon nitride, silica, acidic white clay, or the like may be suitably used. As the combustion adjusting agent, a metal oxide, ferrosilicon, activated carbon, graphite, or the like may be suitably used. In addition, single base powder, double base powder, or triple base powder, each of which contains nitrocellulose as a main component, may be used.

The shape of the molding of the gas generating agent may be any of various shapes including particulate shapes such as a granular, pellet, or columnar shape, and a disc shape. In addition, columnar moldings that may be used include a perforated molding having a through hole created therein (for example, a single-hole tubular shape, a multiple-hole tubular shape, or the like). Furthermore, it is preferable that the size and filling amount of the molding is appropriately selected taking into consideration the linear burning rate, the pressure index, and the like of the gas generating agent, in addition to the shape of the gas generating agent.

In such configuration, the paraglider 1 can be directly pushed out and deployed by the propulsion of the piston 81. Note that the opening end of the housing 86 is closed by a lid 87 in the initial state, and the lid 87 is to be removed from the opening end by the paraglider 1 being pushed out.

As illustrated in FIG. 2, the brake cord pulling device 10 includes a support base 11, a servomotor 12, a reel shaft 13, and a reel 14. A pair of the brake cord pulling devices 10 are disposed for the corresponding left and right brake cords 4.

The support base 11 is fixed to the top of the flying object body 31 in the housing 86 of the flying object 30. The servomotor 12 is fixed to one lateral end of the support base 11, and has an output shaft integrated with one end of the reel shaft 13. The reel 14 is supported rotatably around the reel shaft 13. With these configurations, each brake cord pulling device 10 can appropriately perform, with the servomotor 12, the operation of reeling either of the left and right brake cords 4 around either of the left and right reels 14 or unreeling either of the left and right brake cords 4 from either of the reels 14.

Figure 3:
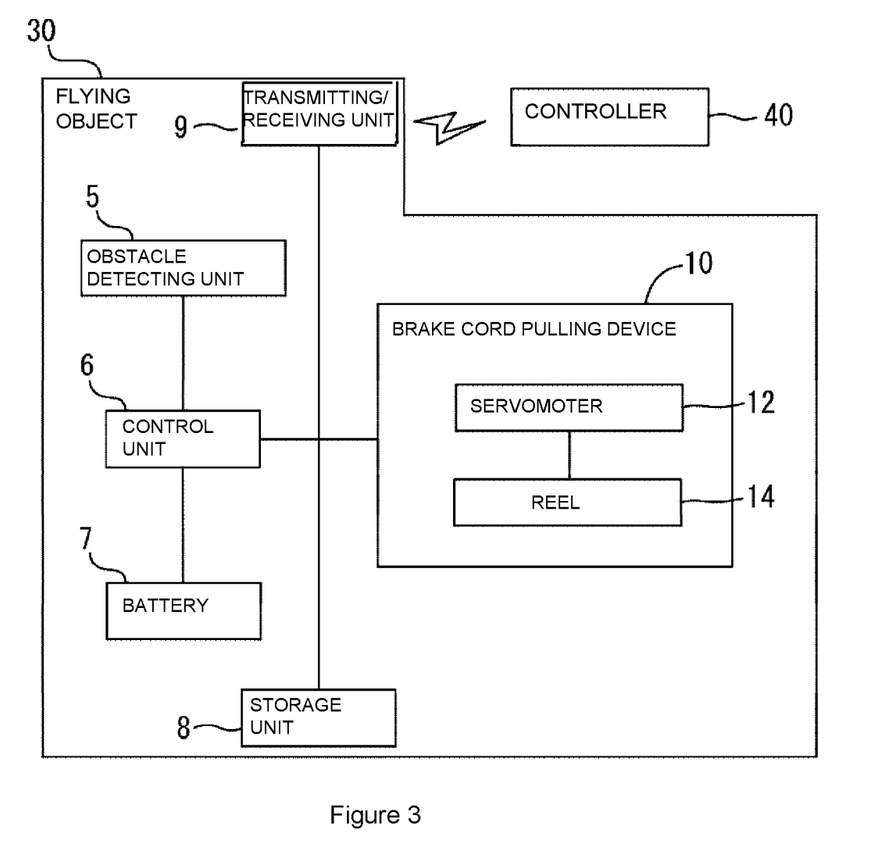
FIG. 3 is a block diagram including a control configuration of the paraglider deployment device in the flying object in FIG. 1.

Furthermore, as illustrated in FIG. 3, the flying object 30 includes an obstacle detecting unit 5, a control unit 6, a battery 7, a storage unit 8 that stores information transmitted from the control unit 6, a transmitting/receiving unit 9 that receives an operation signal from a controller 40 and transmits information regarding the flying object 30 to the controller 40, and others.

The obstacle detecting unit 5 is to detect the altitude of the flying object 30 and outputs an altitude detection signal, which represents the detected altitude information, to the control unit 6. In addition, upon detecting an obstacle present within a predetermined distance from the flying object body 31 or from the obstacle detecting unit 5, the obstacle detecting unit 5 is to output an obstacle detection signal to the control unit 6, detect the distance between the flying object body 31 and the obstacle, and output a distance detection signal, which represents the detected distance information, to the control unit 6. Furthermore, the obstacle detecting unit 5 is to detect an abnormality in the flying object 30 and output an abnormality signal to the control unit 6 on the basis of the detected information. Note that the obstacle detecting unit 5 preferably includes at least one or more of an acceleration sensor, a gyro sensor, an atmospheric pressure sensor, a global positioning system (GPS), a laser sensor, an ultrasonic sensor, an infrared sensor, a millimeter wave radar, a submillimeter wave radar, a camera, a speed sensor, and a wind direction detection sensor, as necessary.

The control unit 6, which is a computer including a CPU, a ROM, a RAM, and the like, transmits operation signals as necessary to control the left and right brake cord pulling devices 10. For example, the control unit 6 is to output signals for activating or deactivating the respective servomotors 12 of the left and right brake cord pulling devices 10. Furthermore, the control unit 6 is to receive an obstacle detection signal, a distance detection signal, and an altitude detection signal (including information regarding the altitude of the flying object 30) from the obstacle detecting unit 5 in real time, and to determine whether to actuate the left and right brake cord pulling devices in accordance with each of the received signals. For example, suppose that the control unit 6 has received an obstacle detection signal or has received a distance detection signal that includes information indicating a distance equal to or less than a predetermined distance. Then, the control unit 6 transmits control signals to the left and right brake cord pulling devices 10 to perform, for example, control to actuate either one of the left and right brake cord pulling devices 10 to keep the flying object 30 away from the obstacle, or control to actuate both the left and right brake cord pulling devices to pull the brake cords so that an impact of collision of the flying object 30 with the obstacle is mitigated. Furthermore, when the obstacle detecting unit 5 detects that an abnormality has occurred in the flying object 30, the control unit 6 is to receive an abnormality signal from the obstacle detecting unit 5 and, in accordance with the received abnormality signal, actuate the gas generator 84 in the actuator 88.

The controller 40, which is used by the operator for manipulating the flying object 30, transmits an operation signal to the transmitting/receiving unit 9 on the basis of an input from the operator. Therefore, the controller 40 is capable of manipulating not only the flying object 30 in the normal state but also the brake cord pulling devices 10 in an emergency. In addition, the controller 40 is capable of receiving various types of information including the flight state (including an abnormal state) of the flying object 30 from the transmitting/receiving unit 9.

The following describes operations of the paraglider deployment device 80.

First, when the flying object 30 faces an emergency during flight, the obstacle detecting unit 5 detects the abnormal state and transmits an abnormality signal to the control unit 6. Upon receiving the abnormality signal, the control unit 6 transmits an operation signal to the actuator 88 in the paraglider deployment device 80. Upon receiving the operation signal, the actuator 88 actuates the gas generator 84 so that the paraglider 1 is ejected out of the housing 86 of the flying object 30 to be in the state illustrated in FIG. 1. Note that, in conjunction with the actuation of the gas generator 84, the brake cord pulling device 10 is made ready for unreeling the brake cord 4. For example, the brake cord pulling device 10 activates the servomotor 12 so as to cause the reel 14 to rotate in the direction of unreeling the brake cord 4, or allows the reel 14 to rotate freely so that the brake cord 4 is pulled out with the ejecting force of the paraglider 1 (the gas pressure of the gas generator 84).

Subsequently, after the paraglider 1 is deployed, while gradually lowering the altitude of the flying object 30, the brake cord pulling device 10 automatically steers the flying object 30 by pulling or unreeling the brake cord 4 on the basis of operation signals from the controller 40 and control signals from the control unit 6, so that the flying object 30 is soft-landed on a safe place, the flying object 30 is automatically kept away from an obstacle if it is likely to collide with the obstacle, or the impact of collision is automatically mitigated in advance in case the flying object 30 is to collide with the obstacle.

The flying object 30 of the present embodiment makes it possible to automatically adjust the tension of the brake cord 4 by reeling or unreeling the brake cord 4. As a result, the flying object 30 can automatically avoid an obstacle if the flying object 30 is likely to collide with the obstacle and, even if the flying object 30 should collide with an obstacle, the flying object 30 can reduce the descending speed to a sufficient degree prior to collision, and thus the impact of collision can be automatically mitigated. In particular, since the flying object 30 of the present embodiment can reduce the descending speed to a sufficient degree immediately before landing, the flying object 30 achieves soft-landing, and thus the impact of collision with the landing place can be automatically mitigated. Furthermore, the flying object 30 can well exert the above-described individual effects even when the flying object 30 is applied to an industrial large-sized flying object.

Second Embodiment

The following describes a flying object according to a second embodiment of the present invention. Note that, unless otherwise noted, descriptions may be omitted regarding matters not described and parts having the reference numerals whose last two digits are the same as those in the first embodiment because they refer to the same parts as in the first embodiment.

Figure 4:
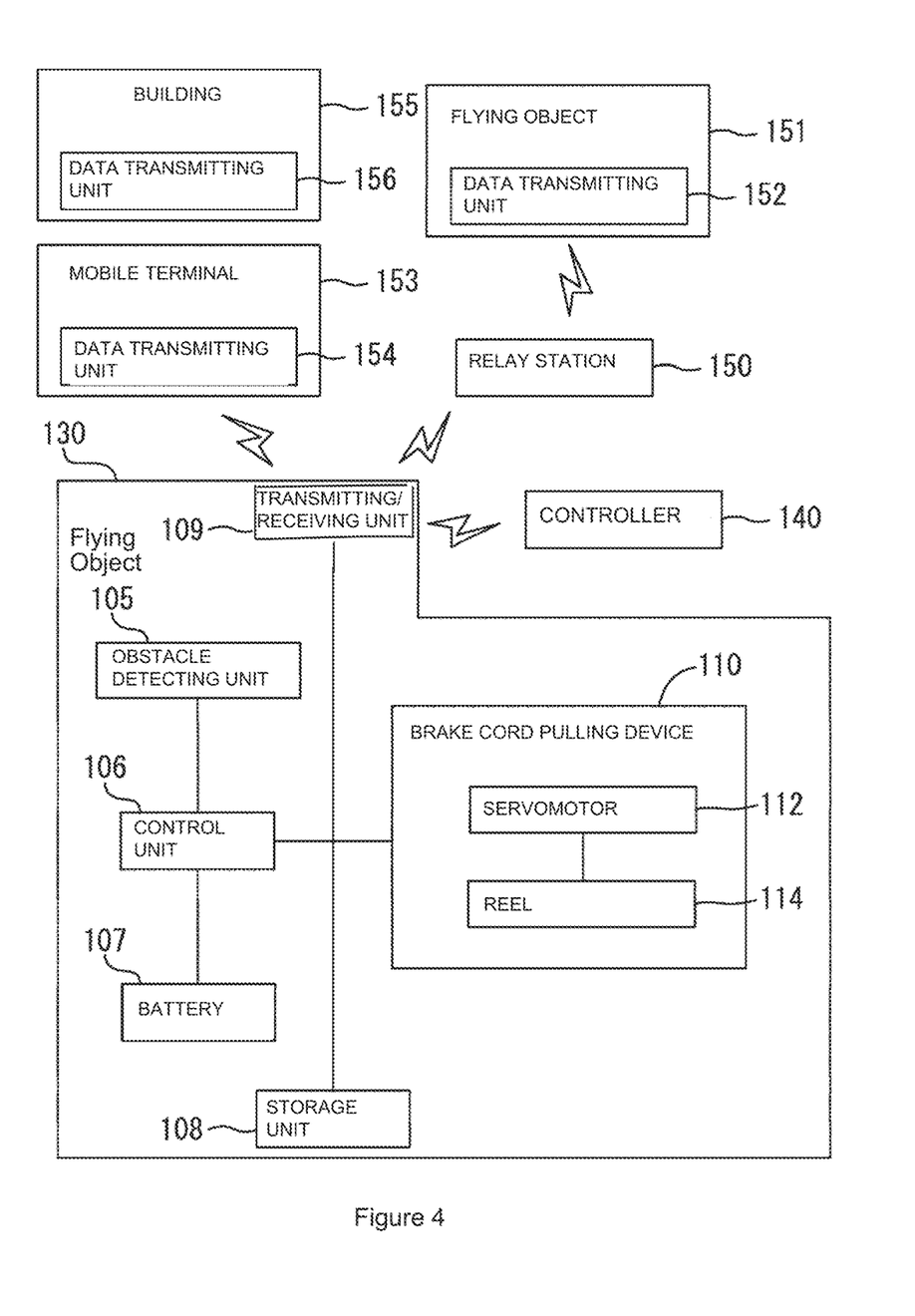
FIG. 4 is a block diagram including a control configuration of a paraglider deployment device according to a second embodiment of the present invention.

The flying object of the present embodiment (the overall view is not shown) is different from the flying object of the first embodiment in that a control configuration of the paraglider deployment device illustrated in FIG. 4 is included. Descriptions are provided below in detail.

Although being almost the same as the flying object 30 of the first embodiment in configuration, the flying object 130 is different from the flying object of the first embodiment in that, as illustrated in FIG. 4, the position data (including altitude data) regarding a flying object 151, a mobile terminal 153, or a building 155 is received via a relay station 150 instead of the transmitting/receiving unit 9 of the first embodiment, or the position data regarding the flying object 151, the mobile terminal 153, or the building 155 is directly received by the transmitting/receiving unit 109.

Note that the relay station 150 includes not only a mere communication base station but also a communication department or the like in charge of air traffic control. Therefore, in the case where the relay station is a communication department or the like in charge of air traffic control, the transmitting/receiving unit 109 can receive, for example, the data relating to air traffic control (information indicating when and in which place a flight is permitted, information regarding flight paths, and the like) along with the position data.

The mobile terminal 153 may be a terminal dedicated to transmitting position data or may be a terminal such as a smart phone. In addition, a data transmitting unit 156 in the building 155 may be a terminal dedicated to transmitting position data or may be a computer terminal that uses a network based on a wireless or wired environment.

The flying object 130 of the present embodiment is capable of communicating with an obstacle such as another flying object, a person, or a building to recognize the position of the obstacle, in addition to providing the same effects as those in the first embodiment. As a result, the flying object is allowed to fly (fall) while avoiding the obstacle in advance and, in addition, even if the flying object should be involved in collision while falling, the damage can be minimized because the flying object can be decelerated in advance in anticipation of the collision.

Third Embodiment

The following describes a flying object according to a third embodiment of the present invention. Note that, unless otherwise noted, descriptions may be omitted regarding matters not described and parts having the reference numerals whose last two digits are the same as those in the first embodiment because they refer to the same parts as in the first embodiment.

Figure 5:
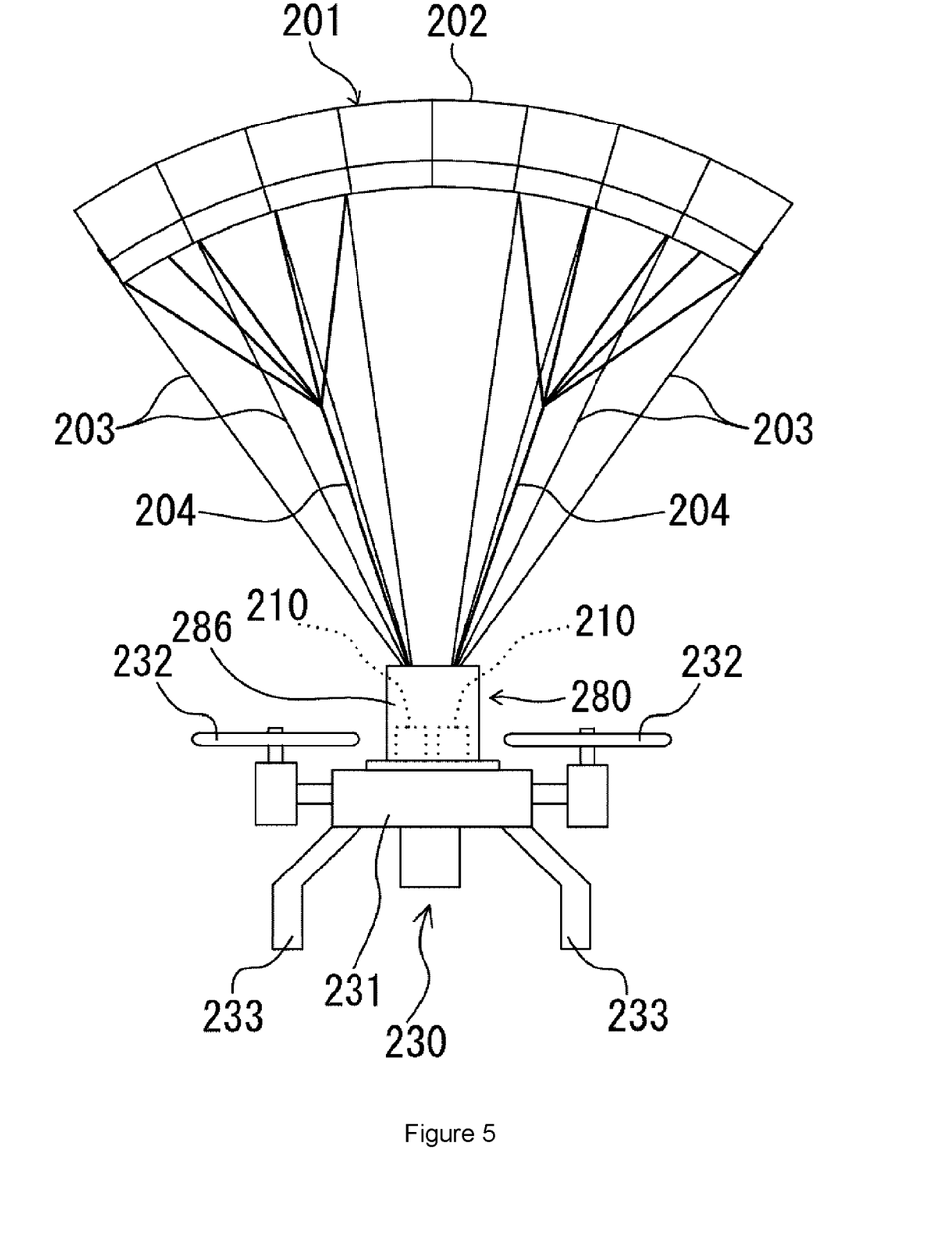
FIG. 5 is a front view of a flying object according to a third embodiment of the present invention, with a paraglider disposed therein being deployed.

As illustrated in FIG. 5, the flying object 230 includes a flying object body 231, one or more propelling mechanisms (propellers, for example) 232 coupled to the flying object body 231 to propel the flying object body 231, a plurality of legs 233 disposed under the flying object body 231, and a paraglider deployment device 280.

With reference to FIG. 5, the paraglider 201 includes a canopy 202 that bears air to form an airfoil as a whole and a plurality of suspension lines 203 that are extended downward from the canopy 202 and connected to the flying object 230.

As illustrated in FIG. 5, the canopy 202 is formed so as to spread out sideways into a substantially arc shape above the flying object 230 as viewed from the front of the paraglider 201. The suspension lines 203 (lines) are extended from the canopy 202 to the flying object 230 so that two groups of four lines are horizontally symmetrical. Note that one end of each suspension line 203 may be connected to a device attached to the flying object 230.

A pair of left and right brake cords 204 are used for steering the flying object 230. One end of each brake cord is midway branched into four cords symmetrically and connected to a rear edge of the canopy 202, and the other end of each brake cord is connected to a reel 214 of each brake cord pulling device 210 (an example of a steering unit), which is described later.

In an emergency, the flying object 230 having the paraglider deployment device 280 deployed is to be manipulated to turn, move upward, or move downward by deforming the canopy 202 to change the received wind pressure resistance through operation of the left and right brake cords 204. For example, to turn the flying object 230 clockwise, the right brake cord 204 is pulled to increase the resistance to the right side of the canopy 202 so that the right side of the canopy 202 is decelerated, thereby changing the direction of the flying object 230. In addition, to land the flying object 230, the left and right brake cords 204 are pulled to increase the resistance to the entire canopy 202, whereby the descending speed is decreased and the flying object 230 is landed. Note that the operation of pulling the brake cord 204 refers to the operation of reeling the brake cord 204 around the reel 214 of the brake cord pulling device 210, which is described later.

Figure 6:
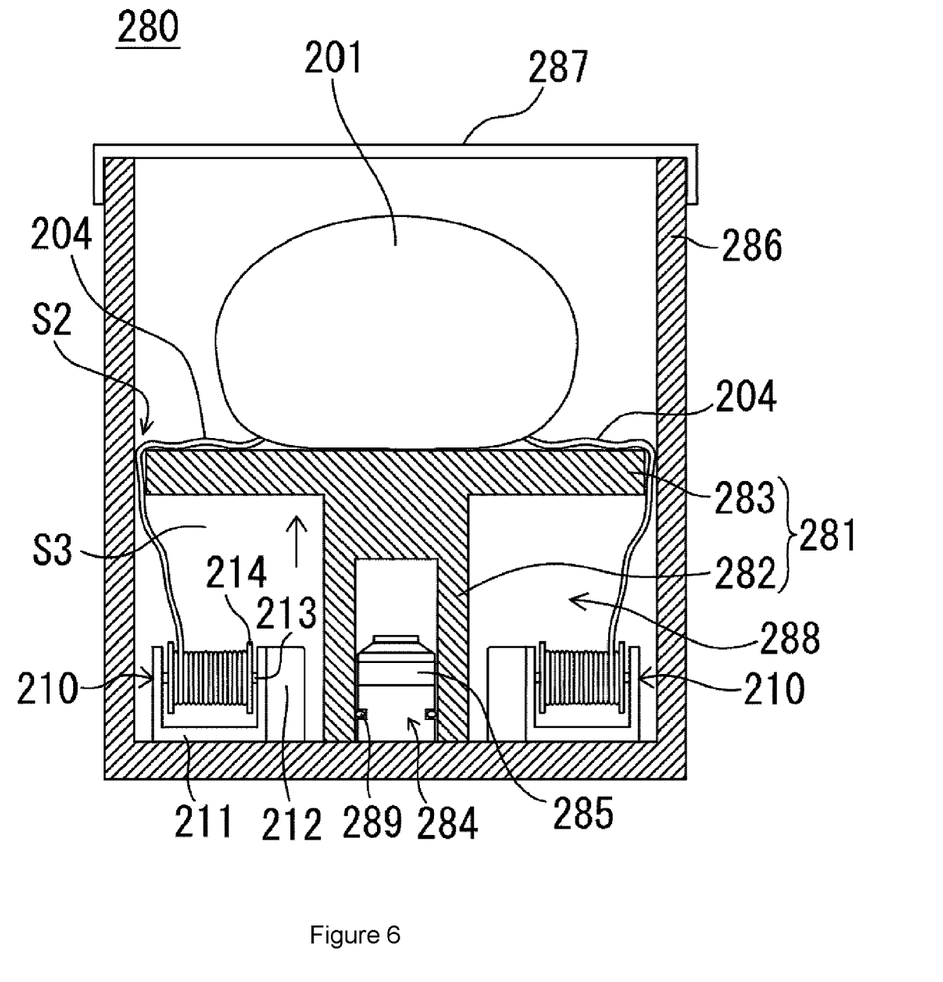
FIG. 6 is a cross-sectional view of a paraglider deployment device in FIG. 5, the deployment device being not actuated yet.

As illustrated in FIG. 6, the paraglider deployment device 280 before actuated includes an actuator 288, the paraglider 201, and the brake cord pulling device 210. The actuator 288 includes a gas generator 284 that includes a case 285 being cup-shaped and containing an ignition charge (not illustrated), a piston 281 (moving member) that includes a recess (recessed member) 282 and a piston head 283 (launch platform) formed integrally with the recess 282, and a housing 286 (container) that is bottomed tubular, contains the piston 281, and regulates the propelling direction of the piston 281. Note that the paraglider 201 and the suspension lines 203 in the paraglider deployment device 280 in the normal state (before deployment) are folded and contained in the cylindrical housing 286. In an emergency, the paraglider 201 and the suspension lines 203 are ejected out of the housing 286, caused by activation of the actuator 288 (see FIG. 6) or the like that has received an abnormality signal from a control unit 206 (see FIG. 7) in the flying object 230, and then deployed as illustrated in FIG. 5 and used.

In addition, as illustrated in FIG. 6, a communicating portion S2, which constitutes a gap (clearance), is formed between the inner wall of the housing 286 and the periphery of the piston head 283. When the piston 281 is moved (ejected in the direction of the arrow in FIG. 6), a space S3 between the inner wall of the housing 286 and the piston head 283 is subjected to a negative pressure. However, since air enters the space S3 from the communicating portion S2, the negative pressure can then be reduced to allow the piston 281 to move smoothly.

The gas generator 284 is disposed in the recess 282. A gas jet nozzle is disposed at the tip of the gas generator 284 so that ignition caused by an electrical signal can generate a gas in the recess 282, the gas serving as a propulsive force for ejecting the piston 281 in the direction of the arrow in FIG. 6. In addition, a seal member 289 such as an O-ring is disposed between the recess 282 and the outer wall of the gas generator 284 so as to prevent gas leakage during actuation.

Although not illustrated, the gas generator 284, which is small-sized and lightweight, includes a cup body filled with a gas generating agent, an exploder for igniting the gas generating agent, and a holder for holding the exploder. The gas generator 284 may be, for example, a micro gas generator; however, any device may be used as long as the device is capable of generating a gas. Note that the gas generating agent is an agent (gun powder or propellant) that is ignited by thermal particles generated by the actuated exploder and burns to generate a gas.

In general, gas generators can be roughly divided into those of non-gun powder type and those of gun powder type. A mainstream gas generator of non-gun powder type is caused to emit a gas by connecting a sharp member such as a needle and a compressed spring to a gas cylinder that contains a gas such as carbon dioxide or nitrogen, and blowing off the sharp member using a spring force so that the sharp member collides against a sealing plate that seals the cylinder. In this case, a drive source such as a servomotor is usually used to release the compressive force of the spring. A gas generator of gun powder type may be an independent exploder unit or may include an exploder and a gas generating agent. Alternatively, a gas generator of hybrid type or stored type in which a sealing plate in a small gas cylinder is cleaved by a force of gun powder to release an internal gas to the outside may be used. In this case, the pressurized gas in the gas cylinder is selected from at least one of non-combustible gases such as argon, helium, nitrogen, and carbon dioxide. In addition, the gas generator may include a heating element of gun powder type to ensure that the pressurized gas, when released, is expanded. Furthermore, the gas generator may include a filter and/or an orifice for adjusting the gas flow rate, as necessary.

As the gas generating agent, a non-azide based gas generating agent is preferably used and, in general, a gas generating agent is formed into a molding containing a fuel, an oxidizing agent, and an additive. As the fuel, for example, a triazole derivative, a tetrazole derivative, a guanidine derivative, an azodicarbonamide derivative, a hydrazine derivative, or the like, or a combination thereof is used. Specifically, for example, nitroguanidine, guanidine nitrate, cyanoguanidine, 5-aminotetrazole, or the like is suitably used. As the oxidizing agent, for example, a basic nitrate such as basic copper nitrate, a perchlorate such as ammonium perchlorate and potassium perchlorate, or a nitrate containing cations selected from alkali metals, alkaline earth metals, transition metals, and ammonia is used. As the nitrate, for example, sodium nitrate, potassium nitrate, or the like is suitably used. Examples of the additive include a binder, a slag forming agent, and a combustion adjusting agent. As the binder, for example, an organic binder such as a metal salt of carboxymethyl cellulose or stearate, or an inorganic binder such as synthetic hydroxytalcite or acidic white clay may be suitably used. As the slag forming agent, silicon nitride, silica, acidic white clay, or the like may be suitably used. As the combustion adjusting agent, a metal oxide, ferrosilicon, activated carbon, graphite, or the like may be suitably used. In addition, single base powder, double base powder, or triple base powder, each of which contains nitrocellulose as a main component, may be used.

The shape of the molding of the gas generating agent may be any of various shapes including particulate shapes such as a granular, pellet, or columnar shape, and a disc shape. In addition, columnar moldings that may be used include a perforated molding having a through hole created therein (for example, a single-hole tubular shape, a multiple-hole tubular shape, or the like). Furthermore, it is preferable that the size and filling amount of the molding is appropriately selected taking into consideration the linear burning rate, the pressure index, and the like of the gas generating agent, in addition to the shape of the gas generating agent.

In such configuration, the paraglider 201 can be directly pushed out and deployed by the propulsion of the piston 281. Note that the opening end of the housing 286 is closed by a lid 287 in the initial state, and the lid 287 is to be removed from the opening end by the paraglider 201 being pushed out.

As illustrated in FIG. 6, the brake cord pulling device 210 includes a support base 211, a servomotor 212, a reel shaft 213, and a reel 214. A pair of the brake cord pulling devices 210 are disposed for the corresponding left and right brake cords 204.

The support base 211 is fixed to the top of the flying object body 231 in the housing 286 of the flying object 230. The servomotor 212 is fixed to one lateral end of the support base 211, and has an output shaft integrated with one end of the reel shaft 213. The reel 214 is supported rotatably around the reel shaft 213. With these configurations, each brake cord pulling device 210 can appropriately perform, with the servomotor 212, the operation of reeling either of the left and right brake cords 204 around either of the left and right reels 214 or unreeling either of the left and right brake cords 204 from either of the reels 214.

Figure 7:
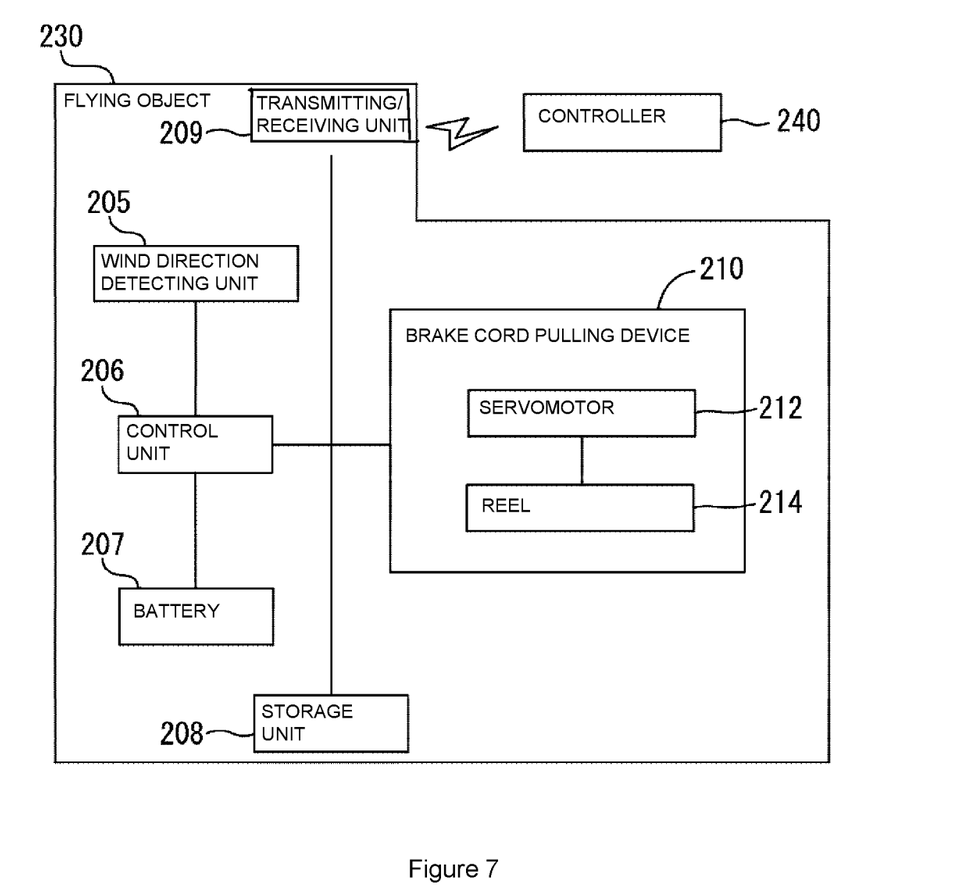
FIG. 7 is a block diagram including a control configuration of the paraglider deployment device according to the third embodiment of the present invention.

Furthermore, as illustrated in FIG. 7, the flying object 230 includes a wind direction detecting unit 205, a control unit 206, a battery 207, a storage unit 208 that stores information transmitted from the control unit 206, a transmitting/receiving unit 209 that receives an operation signal from a controller 240 and transmits information regarding the flying object 230 to the controller 240, and others.

The wind direction detecting unit 205 is to detect, at intervals of one second or less, the direction of the wind blowing to the flying object 230 (the wind speed is additionally detected as necessary) and output a wind direction signal representing the information regarding the detected wind direction (including the information regarding wind speed if wind speed is detected) to the control unit 206. As the wind direction detecting unit 205, for example, at least one of the following is preferably disposed: (a) a weathercock-type wind direction indicator; (b) at least one wind speed meter; (c) a wind direction indicator including a high-rate global positioning system (GPS) that determines positions at a higher rate than an ordinary GPS (for example, a high-rate GPS determines positions at 10 Hz while an ordinary GPS determines positions at 1 Hz) and a geomagnetic sensor that detects the orientation of the flying object 230 (for example, configured to detect the absolute wind direction at intervals of 0.1 seconds or less); (d) a wind direction indicator including an acceleration sensor, a GPS, and a compass (for example, configured to detect the absolute wind direction at intervals of one second or less). Note that, for example, in the case where an altimeter is disposed in the flying object 230 so as to transmit altitude information to the control unit 206 and both of the wind direction indicators (c) and (d) above are disposed, either of the wind direction indicators (c) and (d) above may be used in accordance with the altitude. That is, for example, the wind direction indicator (d) above may be used at a higher altitude, while the wind direction indicator (c) above may be used when the altitude is equal to or lower than a predetermined altitude. In addition, in the case where the wind direction signals transmitted from the wind direction detecting unit 205 are analog signals, an AD converter that converts an analog signal into a digital signal is connected between the wind direction detecting unit 205 and the control unit 206, as necessary.

The control unit 206, which is a computer including a CPU, a ROM, a RAM, and the like, transmits operation signals as necessary to control the left and right brake cord pulling devices 210. For example, the control unit 206 is to output signals for activating or deactivating the respective servomotors 212 of the left and right brake cord pulling devices 210. Furthermore, the control unit 206 is to receive a wind direction signal from the wind direction detecting unit 205 in real time, and to determine whether to actuate the left and right brake cord pulling devices 210 in accordance with the received wind direction signal. For example, upon receiving a wind direction signal, the control unit 206 transmits a control signal to the left and right brake cord pulling devices 210 to perform, for example, control to actuate either one of the left and right brake cord pulling devices 210 so that the flying object 230 moves in an appropriate direction with respect to the wind direction (for example, so that the flying object 230 moves without tailwind) (steering control of the moving direction of the flying object 230). Furthermore, when an abnormality sensor (not illustrated) detects that an abnormality has occurred in the flying object 230, the control unit 206 is to receive an abnormality signal from the abnormality sensor and, in accordance with the received abnormality signal, actuate the gas generator 284 in the actuator 288.

The controller 240, which is used by the operator for manipulating the flying object 230, transmits an operation signal to the transmitting/receiving unit 209 on the basis of an input from the operator. Therefore, the controller 240 is capable of manipulating not only the flying object 230 in the normal state but also the brake cord pulling devices 210 in an emergency. In addition, the controller 240 is capable of receiving various types of information including the flight state (including an abnormal state) of the flying object 230 from the transmitting/receiving unit 209.

The following describes operations of the paraglider deployment device 280.

First, when the flying object 230 faces an emergency during flight, the abnormality sensor (not illustrated) detects the abnormal state and transmits an abnormality signal to the control unit. Upon receiving the abnormality signal, the control unit 206 transmits an operation signal to the actuator 288 in the paraglider deployment device 280. Upon receiving the operation signal, the actuator 288 actuates the gas generator 284 so that the paraglider 201 is ejected out of the housing 286 of the flying object 230 to be in the state illustrated in FIG. 5. Note that, in conjunction with the actuation of the gas generator 284, the brake cord pulling device 210 is made ready for unreeling the brake cord 204. For example, the brake cord pulling device 210 activates the servomotor 212 so as to cause the reel 214 to rotate in the direction of unreeling the brake cord 204, or allows the reel 214 to rotate freely so that the brake cord 204 is pulled out with the ejecting force of the paraglider 201 (the gas pressure of the gas generator 284).

Subsequently, after the paraglider 201 is deployed, while gradually lowering the altitude of the flying object 230, the brake cord pulling device 210 automatically steers the flying object 230 by pulling or unreeling the brake cord 204 on the basis of operation signals from the controller 240 and control signals from the control unit 206 that has received a wind direction signal from the wind direction detecting unit 205, so that the flying object 230 is soft-landed on a safe place, the flying object 230 is automatically kept away from an obstacle if it is likely to collide with the obstacle, or the impact of collision is automatically mitigated in advance in case the flying object 230 is to collide with the obstacle.

The flying object 230 of the present embodiment makes it possible to automatically adjust the tension of the brake cord 204 by reeling or unreeling the brake cord 204. Accordingly, when, for example, the flying object 230 faces a tailwind, the flying object can be steered to quickly change its moving direction so that the flying object 230 moves in a direction without tailwind. Therefore, the flying object 230 of the present embodiment makes it possible to deal with the situation before the flying object 230 stalls and falls even when the altitude is relatively low, and thus the flying object 230 is prevented from falling. Furthermore, the flying object 230 can well exert the above-described individual effects even when the flying object 230 is applied to an industrial large-sized flying object.

Embodiments of the present invention have been described above; however, these embodiments are illustrated merely as specific examples and do not particularly limit the present invention. Specific configurations and the like can be appropriately re-designed. In addition, the operation and effects described in the embodiments of the present invention are merely listed as most preferred operation and effects arising from the present invention. Operation and effects according to the present invention are not limited to those described in the embodiments of the present invention.

In each of the above-described embodiments, the paraglider deployment device includes two brake cord pulling devices for the corresponding left and right brake cords; however, the paraglider deployment device may be configured to reel the left and right brake cords with a single brake cord pulling device.

The example in the second embodiment shows that the obstacle detecting unit 105 is disposed; however, the example is not restrictive and thus the obstacle detecting unit 105 may not necessarily be disposed.

The example in the third embodiment shows that the wind direction detecting unit 205 is disposed; however, as illustrated in the first embodiment, an obstacle detecting unit that detects an obstacle and transmits an obstacle detection signal to the control unit may be disposed. Accordingly, the control unit that has received the obstacle detection signal performs control to appropriately operate the brake cord pulling device (steering control of the moving direction of the flying object), whereby the flying object can automatically avoid an obstacle if the flying object is likely to collide with the obstacle and, even if the flying object should collide with an obstacle, the flying object can reduce the descending speed to a sufficient degree prior to collision, and thus the impact of collision can be automatically mitigated.

REFERENCE SIGNS LIST 1, 201 Paraglider
2, 202 Canopy
3, 203 Suspension line
4, 204 Brake cord
5, 105 Obstacle detecting unit
6, 106, 206 Control unit
7, 107, 207 Battery
8, 108, 208 Storage unit
9, 109, 209 Transmitting/receiving unit
10, 110, 210 Brake cord pulling device
11, 211 Support base
12, 112, 212 Servomotor
13, 213 Reel shaft
14, 114, 214 Reel
30, 130, 151, 230 Flying object
31, 231 Flying object body
32, 232 Propelling mechanism
33, 233 Leg
40, 240 Controller
80, 280 Paraglider deployment device
81, 281 Piston
82, 282 Recess
83, 283 Piston head
84, 284 Gas generator
85, 285 Case
86, 286 Housing
87, 287 Lid
88, 288 Actuator
89, 289 Seal member
150 Relay station
152, 154, 156 Data transmitting unit
153 Mobile terminal
155 Building
205 Wind direction detecting unit
S, S3 Space
S1, S2 Communicating portion

The invention claimed is:

1. A flying object comprising:
a flying object body;
a to-be-deployed object that is disposed in the flying object body and includes a lift generating member and a steering unit capable of steering the lift generating member after deployment via a connecting member connected to the lift generating member;

a wind direction detecting unit that is disposed in the flying object body and detects a wind direction; and, a control unit that receives, when the wind direction detecting unit detects the wind direction, a wind direction signal including information regarding the wind direction from the wind direction detecting unit;

wherein after the to-be-deployed object is deployed, the control unit performs control to operate the steering unit, as necessary, on a basis of the wind direction signal received from the wind direction detecting unit.

2. The flying object according to claim 1, further comprising:

a deployment device for the lift generating member, the deployment device being disposed in the flying object body;

wherein the deployment device includes a containing unit that holds the lift generating member being in a closed state, and an ejecting unit that ejects the lift generating member from the containing unit; and, wherein after the deployment device is actuated, the control unit performs control to operate the steering unit, as necessary, on a basis of the wind direction signal received from the wind direction detecting unit.

3. The flying object according to claim 1, wherein the wind direction detecting unit detects a wind direction at time intervals of one second or less.

4. The flying object according to claim 1, wherein the wind direction detecting unit is a weathercock-type wind direction indicator.

5. The flying object according to claim 1, wherein the wind direction detecting unit includes at least one wind speed meter.

6. The flying object according to claim 1, wherein the wind direction detecting unit includes a high-rate GPS and a geomagnetic sensor, the high-rate GPS determining positions at a higher rate than a GPS.

7. The flying object according to claim 1, wherein the wind direction detecting unit includes a GPS, an acceleration sensor, and a compass.

* * * * *